(12) United States Patent
Gupta et al.

(10) Patent No.: US 7,451,130 B2
(45) Date of Patent: *Nov. 11, 2008

(54) SYSTEM AND METHOD FOR PROVIDING PREFERRED COUNTRY BIASING OF SEARCH RESULTS

(75) Inventors: Vineet Gupta, Los Altos, CA (US); Ben Gomes, Mountain View, CA (US); John Lamping, Los Altos, CA (US); Mizuki McGrath, San Francisco, CA (US); Amit Singhal, Palo Alto, CA (US); Simon Tong, Mountain View, CA (US)

(73) Assignee: Google Inc., Mountain View, CA (US)

( * ) Notice: Subject to any disclaimer, the term of this patent is extended or adjusted under 35 U.S.C. 154(b) by 355 days.

This patent is subject to a terminal disclaimer.

(21) Appl. No.: 10/607,927

(22) Filed: Jun. 27, 2003

(65) Prior Publication Data

US 2004/0254932 A1    Dec. 16, 2004

Related U.S. Application Data

(60) Provisional application No. 60/479,166, filed on Jun. 16, 2003.

(51) Int. Cl.
*G06F 17/30* (2006.01)
(52) U.S. Cl. ............. 707/3; 707/4; 707/5; 707/101
(58) Field of Classification Search ......... 707/1–10; 718/100; 709/219; 704/1
See application file for complete search history.

(56) References Cited

U.S. PATENT DOCUMENTS

| | | | |
|---|---|---|---|
| 5,056,021 A | 10/1991 | Ausborn | |
| 5,148,541 A | 9/1992 | Lee et al. | 707/2 |
| 5,416,903 A | 5/1995 | Malcolm | 715/703 |
| 5,488,725 A | 1/1996 | Turtle et al. | |
| 5,778,356 A | 7/1998 | Heiny | 707/2 |
| 6,167,369 A | 12/2000 | Schultze | |
| 6,173,275 B1 | 1/2001 | Caid et al. | |

(Continued)

FOREIGN PATENT DOCUMENTS

EP    0 944 002    9/1999

(Continued)

OTHER PUBLICATIONS

Christina Yip Chung et al, "Thematic Mapping—From Unstructured Documents To Taxonomies," CIKM'02, Nov. 4-9, 2002, pp. 608-610, ACM, McLean, Virginia, USA.

(Continued)

*Primary Examiner*—Khanh B Pham
(74) *Attorney, Agent, or Firm*—Harrity & Harrity, LLP

(57) ABSTRACT

A system and method for providing preferred country ordering of search results is described. A search query describing potentially retrievable information provided in a plurality of search result countries is received. A search is executed by evaluating the search query against information characteristics maintained in a searchable data repository. At least one preferred country applicable to search results generated is dynamically determined responsive to the executed search. At least some of the search results are ordered in consideration of the at least one preferred country.

45 Claims, 10 Drawing Sheets

U.S. PATENT DOCUMENTS

| | | |
|---|---|---|
| 6,285,999 B1 | 9/2001 | Page |
| 6,311,180 B1 * | 10/2001 | Fogarty .................. 707/4 |
| 6,356,894 B2 | 3/2002 | Nosohara ................. 707/3 |
| 6,370,498 B1 | 4/2002 | Flores et al. ............. 704/3 |
| 6,377,961 B1 | 4/2002 | Ryu |
| 6,446,061 B1 | 9/2002 | Doerre et al. |
| 6,510,406 B1 | 1/2003 | Marchisio |
| 6,516,337 B1 | 2/2003 | Meadway et al. |
| 6,542,888 B2 | 4/2003 | Marques .................. 707/5 |
| 6,560,597 B1 | 5/2003 | Dhillon et al. |
| 6,623,529 B1 * | 9/2003 | Lakritz ................. 715/536 |
| 6,675,159 B1 | 1/2004 | Lin et al. |
| 6,701,305 B1 | 3/2004 | Holt et al. |
| 6,711,585 B1 | 3/2004 | Copperman et al. |
| 6,952,691 B2 | 10/2005 | Drissi et al. ............. 707/3 |
| 7,028,027 B1 * | 4/2006 | Zha et al. ................ 707/3 |
| 2002/0059228 A1 | 5/2002 | McCall et al. ............ 707/6 |
| 2002/0082464 A1 | 6/2002 | Oblein et al. |
| 2003/0046056 A1 * | 3/2003 | Godoy et al. ............. 704/1 |
| 2003/0191817 A1 * | 10/2003 | Fidler ................... 709/219 |
| 2004/0088196 A1 | 5/2004 | Childress et al. ......... 705/4 |
| 2004/0111254 A1 | 6/2004 | Gogel et al. ............. 704/8 |
| 2004/0128282 A1 | 7/2004 | Kleinberger et al. ...... 707/3 |
| 2004/0194099 A1 * | 9/2004 | Lamping et al. ......... 718/100 |
| 2006/0200766 A1 * | 9/2006 | Lakritz ................. 715/536 |

FOREIGN PATENT DOCUMENTS

| | | |
|---|---|---|
| JP | H09-305518 A | 11/1997 |
| WO | WO 00/41090 A1 | 7/2000 |
| WO | WO 01/25947 A1 | 4/2001 |
| WO | WO 02/07011 A1 | 1/2002 |

OTHER PUBLICATIONS

Hiroyuki Kawano, "Overview of Mondou Web Search Engine Using Text Mining And Information Visualizing Technologies," IEEE, 2001, pp. 234-241.

James Osborn et al "Justice: A Judicial Search Tool Using Intelligent Concept Extraction," ICAIL-99, 1999, pp. 173-181, ACM.

Chen An et al "Fuzzy Concept Graph And Application In Web Document Clustering," 2001, pp. 101-106, IEEE.

Non-final Office Action mailed Jan. 31, 2006 for co-pending U.S. Appl. No. 10/407,476, 50 pages.

Final Office Action mailed Oct. 31, 2006 for co-pending U.S. Appl. No. 10/407,476, 47 pages.

Non-final Office Action mailed Jun. 13, 2007 for co-pending U.S. Appl. No. 10/407,476, 10 pages.

S. Brin and L. Page, "The Anatomy of a Large-Scale Hypertextual Search Engine," (1998).

D. Gourley and E. Totty, "HTTP, the Definitive Guide—HTTP Messages," 2002, 32 pages, O'Reilly and Assocs., Sebastopol, CA.

Final OA mailed Jan. 23, 2008 for co-pending U.S. Appl. No. 10/407,476, 18 pages.

* cited by examiner

SYSTEM AND METHOD FOR PROVIDING PREFERRED COUNTRY BIASING OF SEARCH RESULTS

CROSS-REFERENCE TO RELATED APPLICATION

This non-provisional patent application claims priority under 35 USC § 119(e) to U.S. provisional patent application, Ser. No. 60/479,166, filed Jun. 16, 2003, the disclosure of which is incorporated by reference.

FIELD OF THE INVENTION

The present invention relates in general to information location and, in particular, to a system and method for providing preferred country biasing of search results.

BACKGROUND OF THE INVENTION

Although the Internet traces back to the late 1960s, the widespread availability and acceptance of personal computing and internetworking have resulted in the explosive growth and unprecedented advances in information sharing technologies. In particular, the Worldwide Web ("Web") has revolutionized accessibility to untold volumes of information in stored electronic form to a worldwide audience, including written, spoken (audio) and visual (imagery and video) information, both in archived and real-time formats. In short, the Web has provided desktop access to every connected user to a virtually unlimited library of information in almost every language worldwide.

Information exchange on the Web operates under a client-server model. Individual clients execute Web content retrieval and presentation applications, typically in the form of Web browsers. The Web browsers send request messages for Web content to centralized Web servers, which function as data storage and retrieval repositories. The Web servers parse the request messages and return the requested Web content in response messages.

Search engines have evolved in tempo with the increased usage of the Web to enable users to find and retrieve relevant Web content in an efficient and timely manner. As the amount and types of Web content has increased, the sophistication and accuracy of search engines has likewise improved. Generally, search engines strive to provide the highest quality results in response to a search query. However, determining quality is difficult, as the relevance of retrieved Web content is inherently subjective and dependent upon the interests, knowledge and attitudes of the user.

Existing methods used by search engines are based on matching search query terms to terms indexed from Web pages. More advanced methods determine the importance of retrieved Web content using, for example, a hyperlink structure-based analysis, such as described in S. Brin and L. Page, "The Anatomy of a Large-Scale Hypertextual Search Engine," (1998) and in U.S. Pat. No. 6,285,999, issued Sep. 4, 2001 to Page, the disclosures of which are incorporated by reference.

A typical search query scenario begins with either a natural language question or individual keywords submitted to a search engine. The search engine executes a search against a data repository describing information characteristics of potentially retrievable Web content and identifies the candidate search results. Searches can often return thousands or even millions of results, so most search engines typically rank or score only a subset of the most promising results. The top search results are then presented to the user, usually in the form of Web content titles, hyperlinks, and other descriptive information, such as snippets of text taken from the search results.

Search engines are generally available to users located worldwide. Thus, part of providing high-quality search results is being able to provide those search results from countries preferred by the requesting user. Preferred countries include the country of the user, as well as other acceptable countries. For instance, a Canadian user might also accept search results from the United States.

Currently, the Hypertext Transfer Protocol (HTTP) is used by most Web browser, Web server, and related Web applications, to transact Web information exchange. HTTP is a session-less protocol and no state identifying user preferences, including country, is typically maintained. The only information available to indicate the preferred country of a user are either preferences maintained independently of each HFTP transaction or inferable from the search query itself. User-provided preferences are specified either at the Web client or Web server. Client-side preferences are communicated through request message headers. Server-side preferences are specified via search engine options and are maintained independent of each HTTP transaction using cookies, which must be retrieved from the Web client prior to executing a search, or via a log-in procedure. Although effective at specifying preferred countries, users seldom explicitly set country preferences in practice. As well, country preferences are often too restrictive, presenting an all-or-nothing paradigm. The country preferences can function as a search result filter, providing only those search results in the preferred country and disallowing those search results in related or alternate countries.

Similarly, default settings for specifying preferred countries, either client- or server-side, can further complicate providing suitable search results. Often, default settings can be incorrect. For instance, the United States could be specified as a default country preference by virtue of a Web browser option, but may be unsuitable for presenting search results to a non-United States user.

Accordingly, there is a need to provide an approach to dynamically determining country preferences for the presentation of search results to a user. Preferably, such an approach would accommodate preferred countries, which are acceptable to the user, and include related, alternate and less preferred countries within the country preferences.

There is a further need for an approach to presenting search results in an ordered fashion in accordance with user preferred countries. Preferably, such an approach would order or score search results to favor those search results in preferred countries while accommodating those search results in other countries.

SUMMARY OF THE INVENTION

The present invention provides a system and method for dynamically determining preferred countries and ordering search results in response to a search query. User preferred countries are determined based on an evaluation of interface and Internet protocol (IP) characteristics. Interface characteristics are determined using the search query metadata and search engine interface. IP characteristics are determined also using the search query metadata and the IP address of the client. Search results retrieved responsive to the search query are ordered based on the method utilized by the search engine to organize the search results in consideration of the preferred countries. The search results are ordered by either a predetermined shifting factor or by adjusting a numerical score assigned to each search result by a weighting factor and resorting the search results.

An embodiment provides a system and method for ordering search results. At least one preferred country applicable to search results generated responsive to a search executed on potentially retrievable information and provided in a plurality of search result countries is dynamically determined. At least some of the search results are ordered in consideration of the at least one preferred country.

A further embodiment provides a system and method for providing preferred country ordering of search results. A search query describing potentially retrievable information provided in a plurality of search result countries is received. A search is executed by evaluating the search query against information characteristics maintained in a searchable data repository. At least one preferred country applicable to search results generated is dynamically determined responsive to the executed search. At least some of the search results are ordered in consideration of the at least one preferred country.

A further embodiment provides a system and method for dynamically determining country preferences and ordering of search results. A search query request message is received and at least one of terms and attributes are parsed from the search query request message to identify potentially retrievable Web content provided in a plurality of search result countries. A search is executed by evaluating the at least one of terms and attributes against information characteristics maintained in a searchable data repository. Search results are generated responsive to the executed search. At least one preferred country is determined. Characteristics of at least one of the user interface and the Internet Protocol (IP) are evaluated. The at least one preferred country is selected based on the evaluated characteristics. At least some of the search results are ordered in consideration of the at least one preferred country. The search results are presented as search result response messages.

Still other embodiments of the present invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

System Overview

Figure 1:
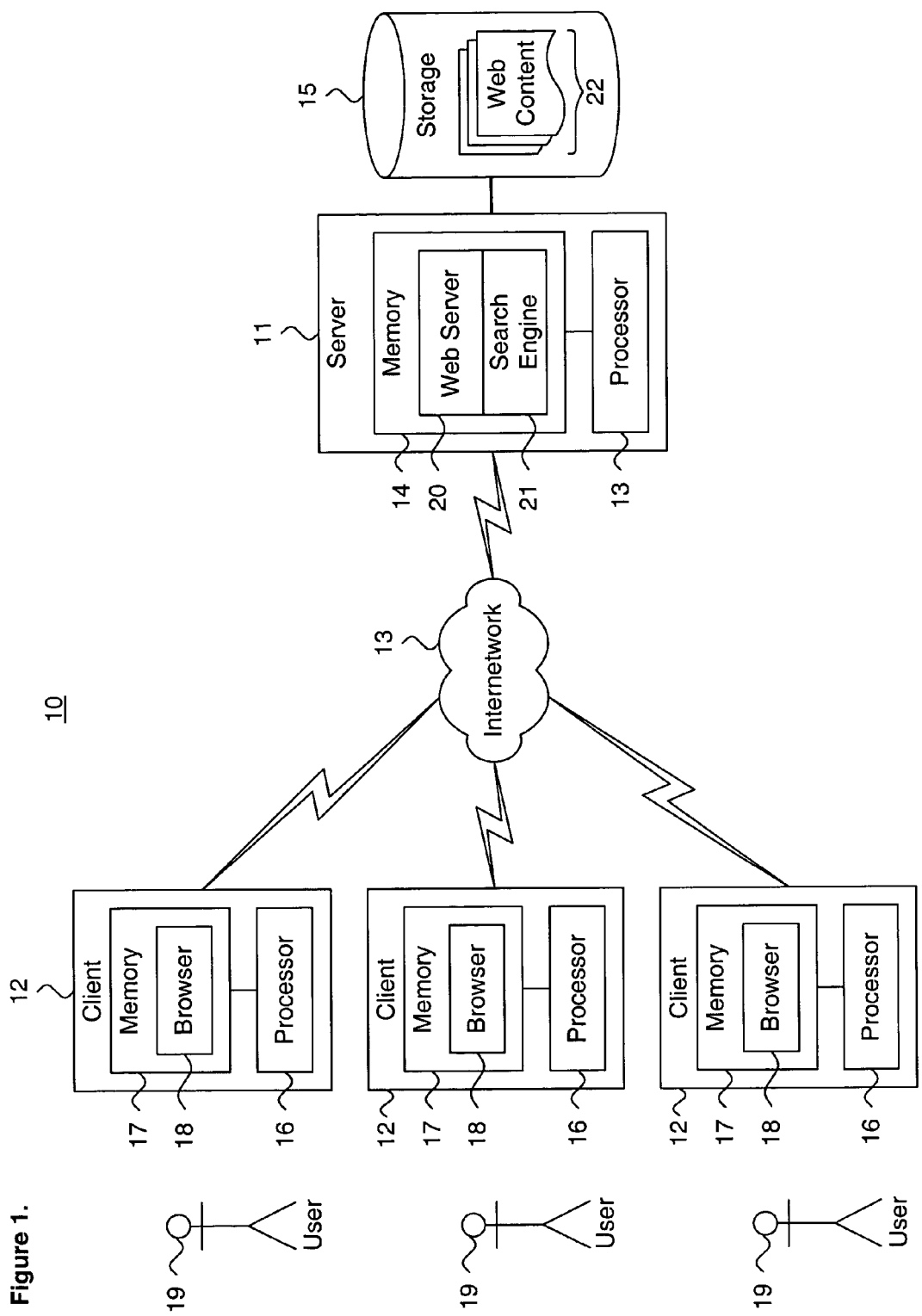
FIG. 1 is a block diagram showing a system for providing preferred country biasing of search results, in accordance with the present invention.

FIG. 1 is a block diagram showing a system 10 for ordering search results, in accordance with the present invention. A plurality of individual clients 12 are communicatively interfaced to a server 11 via an internetwork 13, such as the Internet, or other form of communications network, as would be recognized by one skilled in the art. The individual clients 12 are operated by users 19 who transact requests for Web content and other operations through their respective client 12.

In general, each client 12 can be any form of computing platform connectable to a network, such as the internetwork 13, and capable of interacting with application programs. Exemplary examples of individual clients include, without limitation, personal computers, digital assistances, "smart" cellular telephones and pagers, lightweight clients, workstations, "dumb" terminals interfaced to an application server, and various arrangements and configurations thereof, as would be recognized by one skilled in the art. The internetwork 13 includes various topologies, configurations, and arrangements of network interconnectivity components arranged to interoperatively couple with enterprise, wide area and local area networks and include, without limitation, conventionally wired, wireless, satellite, optical, and equivalent network technologies, as would be recognized by one skilled in the art.

For Web content exchange and, in particular, to transact searches, each client 12 executes a Web browser 18 ("browser") through which search queries are sent to a Web server 20 executing on the server 11. Each search query describes or identifies information, generally in the form of Web content, which is potentially retrievable via the Web server 20. The search query provides characteristics, typically expressed as terms, such as keywords and the like, and attributes, such as country, language and so forth, which enables a search engine 21, also executing on the server 11, to identify and send back search results. The terms and attributes are a form of metadata, which constitute data describing data. Other styles, forms or definitions of search queries, interface characteristics, and metadata are feasible, as would be recognized by one skilled in the art.

The search results are sent back to the browser 18 for presentation, usually in the form of Web content titles, hyperlinks, and other descriptive information, such as snippets of text taken from the search results. The server 11 maintains an attached storage device 15 in which Web content 22 is maintained. The Web content 22 could also be maintained remotely on other Web servers (not shown) interconnected either directly or indirectly via the internetwork 13 and which are preferably accessible by each client 12.

The search engine 21 preferably identifies the Web content 22 best matching the search query terms to provide high quality search results, such as described in S. Brin and L.

Page, "The Anatomy of a Large-Scale Hypertextual Search Engine" (1998) and in U.S. Pat. No. 6,285,999, issued Sep. 4, 2001 to Page, the disclosures of which are incorporated by reference. In identifying matching Web content 22, the search engine 21 operates on information characteristics describing potentially retrievable Web content, as further described below with reference to FIG. 2. Note the functionality provided by the server 20, including the Web server 20 and search engine 21, could be provided by a loosely- or tightly-coupled distributed or parallelized computing configuration, in addition to a uniprocessing environment.

The individual computer systems, including server 11 and clients 12, include general purpose, programmed digital computing devices consisting of a central processing unit (processors 13 and 16, respectively), random access memory (memories 14 and 17, respectively), non-volatile secondary storage 15, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage.

Search Engine Components

Figure 2:
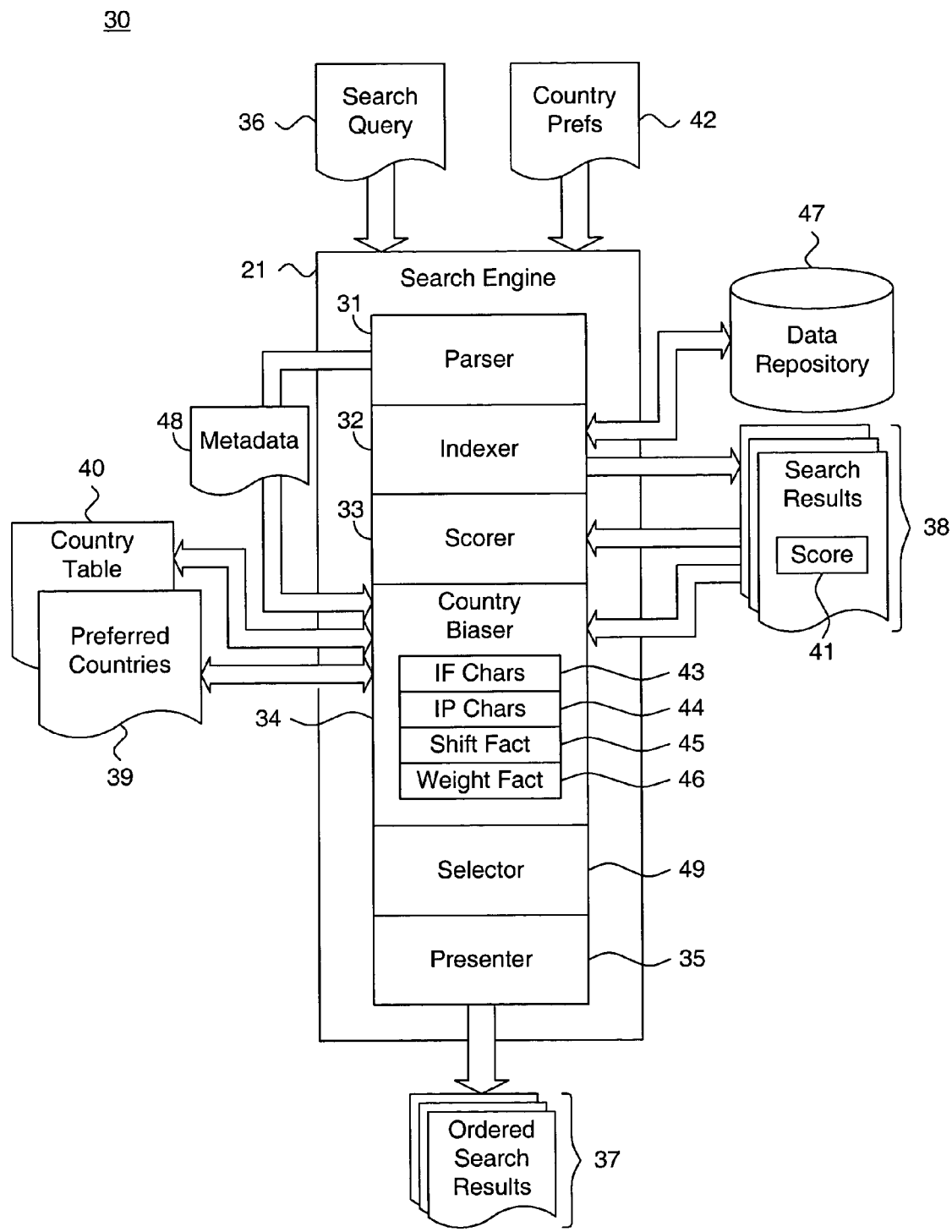
FIG. 2 is a functional block diagram showing the search engine of FIG. 1.

FIG. 2 is a functional block diagram 30 showing the search engine 21 of FIG. 1. Each component is a computer program, procedure or process written as source code in a conventional programming language, such as the C++programming language, and is presented for execution by one or more CPUs as object or byte code in a uniprocessing, distributed or parallelized configuration, as is known in the art. The various implementations of the source code and object and byte codes can be held on a computer-readable storage medium or embodied on a transmission medium in a carrier wave.

The search engine 21 consists of five components: parser 31, indexer 32, scorer 33, country biaser 34, and presenter 35. Briefly, the search engine 21 receives a search query 36 communicated via a browser 18 from a user 19, executes a search, generates search results 38, orders the search results 38 in consideration of country preferences, and sends the ordered search results 37. The search query 36 is preferably provided as a HTTP-compliant request message and the ordered search results 37 are preferably provided as HTTP-compliant response messages, although other forms of request and response exchanges are feasible, as would be recognized by one skilled in the art.

In more detail, the parser 31 receives the search query 36. Each search query 36 describes potentially retrievable information, such as Web content 22. The parser 31 then parses the search query 36 into individual tokens. The tokens include header values constituting metadata 48, and an entity body containing the actual search query. The metadata 48 is copied to the country biaser 34.

The indexer 32 executes the search by evaluating the search query 36 against information characteristics maintained in a searchable data repository 47. The information characteristics are either the actual Web content 22 or metadata, such as hyperlinks, describing terms and attributes used to identify Web content. Other structures and organizations of a searchable data repository 47 are feasible, as would be recognized by one skilled in the art. Upon completing the search, the indexer 32 generates a set of search results 38 by applying the characteristics specified in the search query 36 to the stored information. Other structures and organizations of a searchable data repository 47 are feasible, as would be recognized by one skilled in the art.

Potentially, the indexer 32 can identify thousands or even millions of search results 38, so only a subset of the search results 38, typically between 100 to 10,000, are retained as the most promising search results 38. The most promising search results 38 are then qualitatively ranked or scored by degree of match to the search query terms. The search results 38 can be numerically scored to reflect a relative quality or goodness of match. The scorer 33 assigns a numerical score 41 to each search result 38 for indicating a quality of match.

The indexer 32 also detects the countries associated with each search result 38. The country can be determined in several ways. First, the country can be determined from the extension of the Uniform Resource Locator (URL) of each search result 38. For instance, the URL www.whsmith.co.uk is assumed to be either located in or associated with the United Kingdom. Second, the address of the domain registrar can be examined and the country of business inferred. Similarly, the country can be inferred from the IP address of the Web server from which the search result 38 was obtained, from the search result document, or from other Web pages on the same Web site. Finally, the anchor text of the hyperlinks to the search result document, the text near the hyperlinks, or the countries of the Web pages with hyperlinks to the search result documents can be examined. Preferably, a combination of the foregoing methods can be combined to provide more accurate results. In addition, other techniques for detecting the countries associated with search results are possible, as would be recognized by one skilled in the art.

The country biaser 34 performs two primary functions. First, the country biaser 34 determines one or more preferred countries 39 for each search query 36, as further described below with reference to FIG. 5. In one embodiment, such preferred countries 39 may be determined using a country selector 49. Second, the country biaser 34 orders the search results 38 in consideration of the preferred countries 39, as further described below with reference to FIG. 8. In one embodiment, such search results 38 may be ordered using a search result orderer (not shown). For efficiency, the country biaser 34 preferably orders a subset of the most promising search results 38, typically in the range of 15 to 30 search results, although other ranges could be used, as would be recognized by one skilled in the art.

In the described embodiment, the scorer 33 assigns those search results 38 having a higher degree of match a commensurately higher rank relative to other search results 38. For instance, if Canada was a preferred country 39, those search results 38 originating from Canadian Web servers would have a higher degree of match than search results 38 from, say, Australian Web servers. However, those search results 38 from an alternate preferred country, such as the United States, could also have a higher degree of match than search results 38 from Australian Web servers, but lower degree of match than search results 38 from Canadian Web servers. Alternatively, a counter ranking approach could be used whereby the scorer 33 assigns those search results 38 having a higher degree of match a commensurately lower rank relative to other search results 38. Other styles, assignments or definitions of search result ranking are feasible, as would be recognized by one skilled in the art. As well, the Web servers for a preferred country need not be physically located within the borders of the country and only need present a reasonable nexus to a given country with respect to Web content and logical association, as would be recognized by one skilled in the art.

In another embodiment, the search results 38 are numerically scored to reflect a relative quality or goodness of match.

The scorer 33 assigns a numerical score 41 to each search result 38 for indicating a relative quality of match, with higher numerical scores 41 to reflect better quality than lower numerical scores 41. Those numerical scores 41 assigned to search results 38 from a Web server associated with a preferred country are promoted or "boosted" to provide a preferred country bias. For instance, if Canada was a preferred country 39, those search results 38 from Canadian Web servers would have numerical scores 41 boosted higher than search results 38 from, say, Australian Web servers. Those search results 38 from an alternate preferred country, such as the United States, could also have numerical scores 41 boosted higher than search results 38 from Australian Web servers. However, the search results 38 from Canadian Web servers could still be lower than the search results 38 from United States Web servers if the latter search results 38 provide better overall matches. Alternatively, a counter scoring approach could be used whereby the scorer 33 assigns lower numerical scores 41 to reflect better quality than higher numerical scores 41 and those numerical scores 41 assigned to search results 38 from a Web server associated with a preferred country are demoted to provide a preferred country bias. Other styles, assignments or definitions of search result scoring are feasible, as would be recognized by one skilled in the art. As well, the Web servers for a preferred country need not be physically located within the borders of the country and only need present a reasonable nexus to a given country with respect to Web content and political, social and similar associations, as would be recognized by one skilled in the art. For instance, Web content from a Canadian Web server may actually be physically located on a proxy Web server located in another country, such as the United States.

In a further embodiment, a toolbar is provided as part of the presentation of a Web page on the graphical user interface of the Web browser 18. The toolbar can be in the form of a client-side application, as is known in the art. The toolbar includes a log, which counts the countries from which users visit Web sites. The predominant country or countries are then determined based on the log. In addition, the toolbar can identify Web sites having a worldwide appeal and which should therefore remain unassigned to a particular country. For instance, the Web site for a multinational company, such as Starbucks Corporation, would not be assigned to the United States.

To determine the preferred countries 39, the country biaser 34 evaluates any available country preferences 42, interface characteristics (IF Chars) 43, and IP characteristics (IP Chars) 44. The country preferences 42 are maintained independent of each HTTP transaction using cookies and must be retrieved from the client 12 prior to executing a search, or via a log-in procedure. The interface characteristics 43 may be determined from the metadata 48 and search engine interface and express country preferences can often be specified as user options. The IP characteristics 44 may be determined from the metadata 48 and the Internet protocol (IP) address of the client, which can be mapped to a country table 40 to determine a country with which the search results 38 are associated.

The country biaser 34 orders the search results 38. In one embodiment, non-numerically ordered search results 38 are ordered by a shifting factor 45, as further describe below with reference to FIG. 9. In the described embodiment, a constant shifting factor 45 of two (2.0) is employed to demote search results 38 in non-preferred countries by two positions. This shifting factor 38 is suitable when search results 38 are ordered by decreasing degree of match to the search query 36.

For example, a search result 38 in a non-preferred country occurring in the third position of a list of the search results 38 would be demoted to the fifth position. Other forms of shifting factors could be employed as well. For instance, the shifting factor 45 could promote search results 38 in non-preferred countries. As well, the shifting factor 45 could order the search results 38 by mathematical function, using, for example, additive, subtractive, multiplicative, fractional, divisional, and logarithmic factors, or may be a formula or function, as well as various combinations and arrangements thereof, as would be recognized by one skilled in the art.

In another embodiment, preferable when an adjustment formula is available for a range of numerical scores 41, numerically scored search results 38 are adjusted by a weighting factor 46 to promote or "boost" the numerical scores 41, as further describe below with reference to FIG. 10. Such weighting factor 46 may be a constant, mathematical function using, for example, additive, subtractive, multiplicative, fractional, divisional, and logarithmic factors, or may be a formula or function, as well as various combinations and arrangements thereof, as would be recognized by one skilled in the art. In the described embodiment, the numerical scores 41 increase with the quality of match. For example, a higher numerical score 41 reflects a better quality than lower numerical scores 41. Alternatively, a system may be employed whereby the numerical scores 41 could decrease with quality of match, as would be recognized by one skilled in the art.

In the described embodiment, for search results 38 in one of the preferred countries 39, a weighting factor WLP is provided by the equation:

$$w_{LP} = \left\{ \forall s_{1 \to n} \colon s_i = \frac{s_i + 1}{2} \right\}$$

The weighting factor is most suitable when numerical scores 41 range between 0.0 and 1.0 and are approximately uniformly distributed. Other ranges of numerical scores and forms of weighting factors could be employed as well, as would be recognized by one skilled in the art.

In a further embodiment, the shifting factor 45 and the weighting factor 46 can be adjusted to accommodate less or more reliable dynamic preferred country determination. For instance, a short search query 36 or sparse search results 37 might lower the accuracy of the dynamic preferred country determination due to less context with which to work. The shifting factor 45 and the weighting factor 46 would be relaxed to less aggressively order the search results 37 Alternatively, a long search query 36 or lengthy search results 37 might increase the accuracy and the shifting factor 45 and the weighting factor 46 would be increased to more aggressively order the search results 37.

In addition, the search engine 21 can optionally include a language promoter (not shown) to determine preferred languages and less preferred languages, such as described in commonly-assigned U.S. provisional patent application Ser. No. 60/459,339, filed Mar. 31, 2003, pending, and U.S. patent application Ser. No. 10/407,476, filed Apr. 3, 2003, pending, the disclosures of which are incorporated by reference. In the described embodiment, the language promoter evaluates interface characteristics, IP characteristics, and search result characteristics for providing preferred language ordering of search results 37, either in conjunction with or as an adjunct to the country biaser 34.

Finally, the presenter 35 presents the ordered search results 37 to the user 19 via the browser 18. Typically, only a part of the ordered search results 37 need be presented since the full set of ordered search results 37 can exceed available presentation space on the browser 18. Presentation is the communication of the ordered search results 37 by means of a search result response message.

Search Query Execution and Search Results Processing

Figure 3:
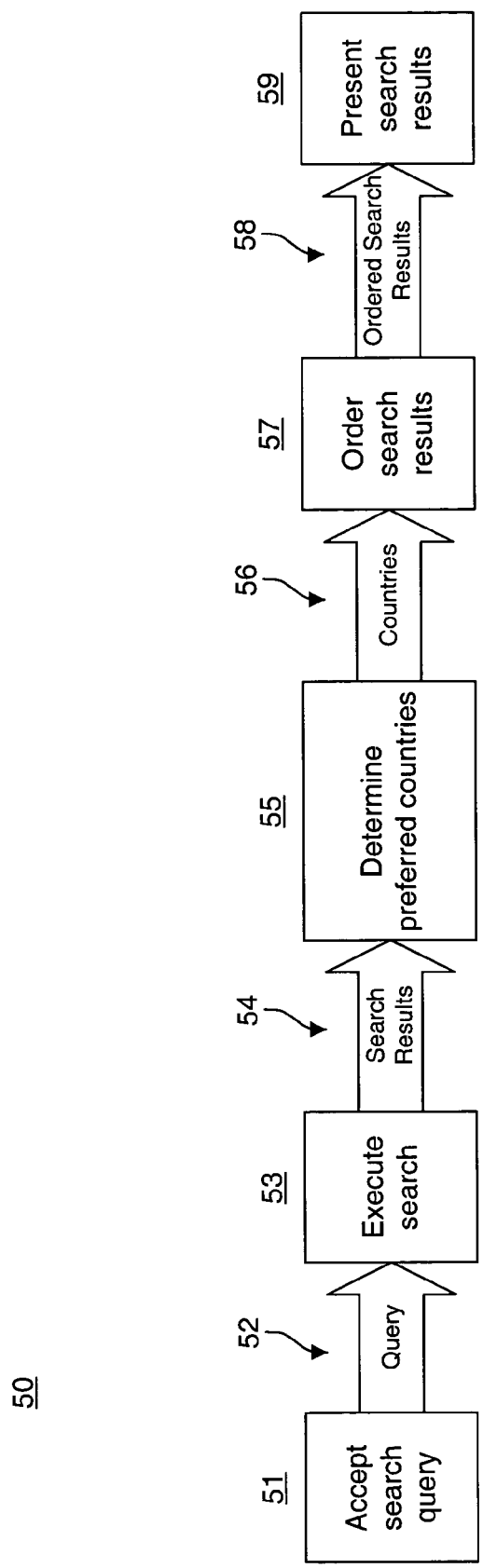
FIG. 3 is a process flow diagram showing search query execution and search results processing by the search engine of FIG. 1.

FIG. 3 is a process flow diagram 50 showing search query execution and search results processing by the search engine 21 of FIG. 1. The process flow proceeds in five primary phases. First, a search query 52 is accepted and parsed (process 51) and is forwarded to the next phase. A search is executed (process 53) against a stored data repository and search results 54 are forwarded to the next phase. The preferred countries 56 of the user 19 are determined (process 55) based on metadata, the search engine interface, the IP address of the client, and other available context. The preferred countries 56 are forwarded to the next phase for use in ordering the search results 54 (process 57). In the final phase, the ordered search results 58 are forwarded and presented (process 59). The phases of determining the preferred countries (process 55) and ordering the search results (process 57) enhance the quality of the search results by tailoring the search results in accordance with dynamically determined user country preferences.

Method Overview

Figure 4:
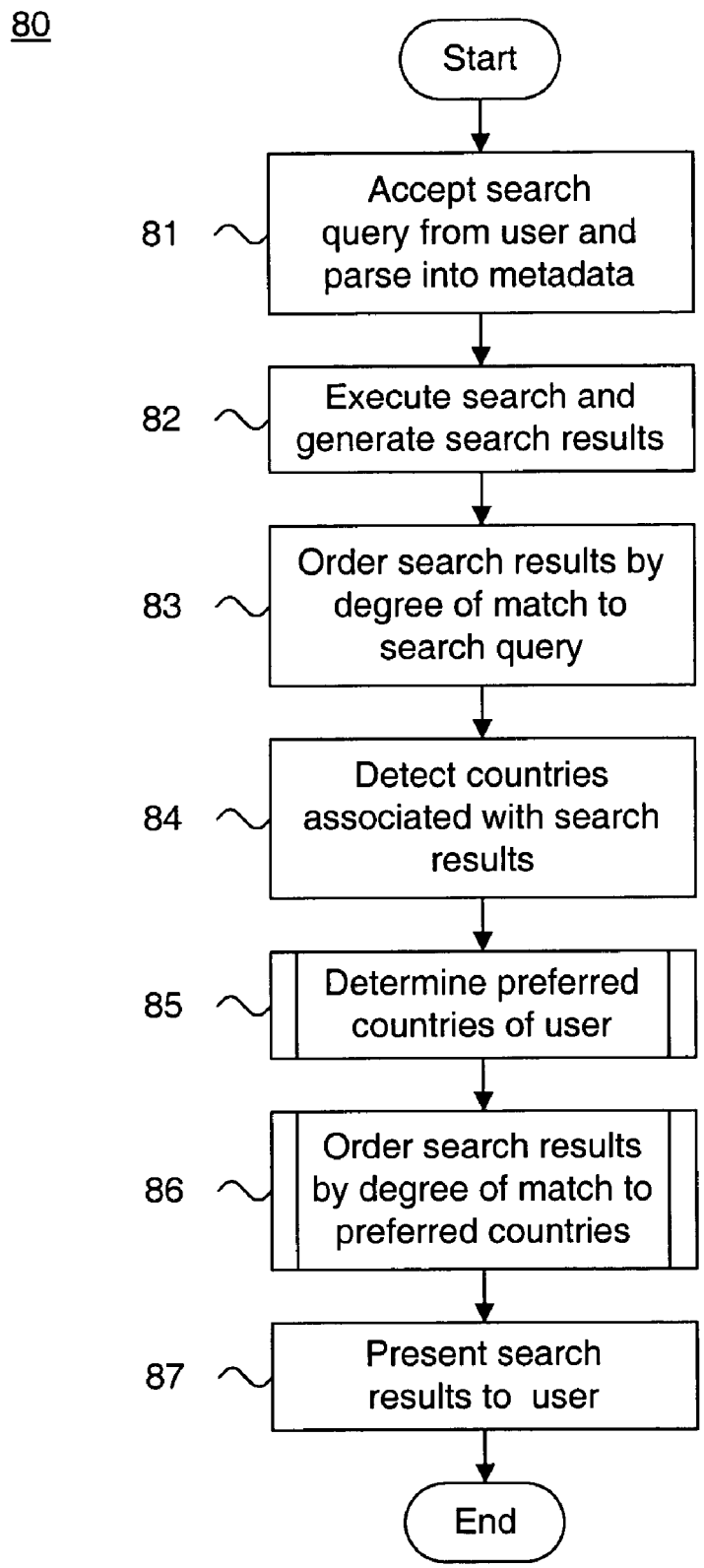
FIG. 4 is a flow diagram showing a method for providing preferred country biasing of search results, in accordance with the present invention.

FIG. 4 is a flow diagram showing a method 80 for ordering search results 38, in accordance with the present invention. The method 80 is described as a sequence of process operations or steps, which can be executed, for instance, by a search engine 21 (shown in FIG. 1).

A search query 36 is accepted from a user 19 and parsed into metadata 48 (block 81). A search is executed on a searchable data repository 47 by evaluating the search query 36 against information characteristics maintained in the searchable data repository 47 and search results 38 are generated (block 82). Since thousands or even millions of search results 38 can potentially be generated, only a subset of the search results 38, typically between 100 to 10,000, are retained as the most promising search results 38. Prior to providing the search results 38 to the browser 18, the search results 38 can be temporarily staged as "raw" Web pages, structured data, or unstructured data, from which metadata describing the characteristics of each search result 38 can be extracted, as is known in the art. The search results 38 are qualitatively ordered by degree of match to the search query 36 (block 83) to provide a ranking or scoring, including a numerical score 41, reflecting search result quality, as described above with reference to FIG. 2. The countries associated with the search results 38 are detected (block 84). The countries can be determined from the URL extension of each search result 38 or by examining the domain registrar address and inferring the country of business. The country can also be inferred from the IP address of the Web server from which the search result 38 was obtained, from the search result document, or from other Web pages on the same Web site or by examining the anchor text of the hyperlinks to the search result document, the text near the hyperlinks, or the countries of the Web pages with hyperlinks to the search result documents. A combination of the foregoing methods can be combined to provide more accurate results. In addition, other techniques for detecting the countries associated with search results are possible, as would be recognized by one skilled in the art.

Up to this point, the search results 38 have been identified and ranked or scored. The preferred countries 39 of the requesting user 19 are then determined (block 85), as further described below with reference to FIG. 5. The search results 38 are then ordered by degree of match to the preferred countries 39 (block 86), as further described below with reference to FIG. 8. For efficiency, preferably only a subset of the most promising search results 38, typically in the range of 15 to 30 search results, are ordered, although other ranges could be used, as would be recognized by one skilled in the art. Finally, the ordered search results 37 are presented via the browser 18 (block 87). Typically, only a part of the ordered search results 37 need be presented since the full set of ordered search results 37 can exceed available presentation space on the browser 18. In the described embodiment, the search query 36 is provided as an HTTP-compliant request message and each search result is provided back to the user 19 as an HTTP-compliant response message.

In a further embodiment, the preferred countries 39 are stored for future use while executing search queries 36 from the same requesting user 19. As well, the ability to present the ordered search results 37 using preferred country ordering could be controlled by enabling or disabling presentation in the preferred countries 39 using a "toggle" provided via the user interface. In a still further embodiment, the ordered search results 37 are grouped together in each of the preferred countries 39 prior to presentation to the requesting user 19. Alternatively, the ordered search results 37 in the preferred countries 39 can be arranged for presentation next to those search results in non-preferred countries, such as by using adjacent columns or cells in a table. The routine then terminates.

Determining Preferred Countries

Figure 5:
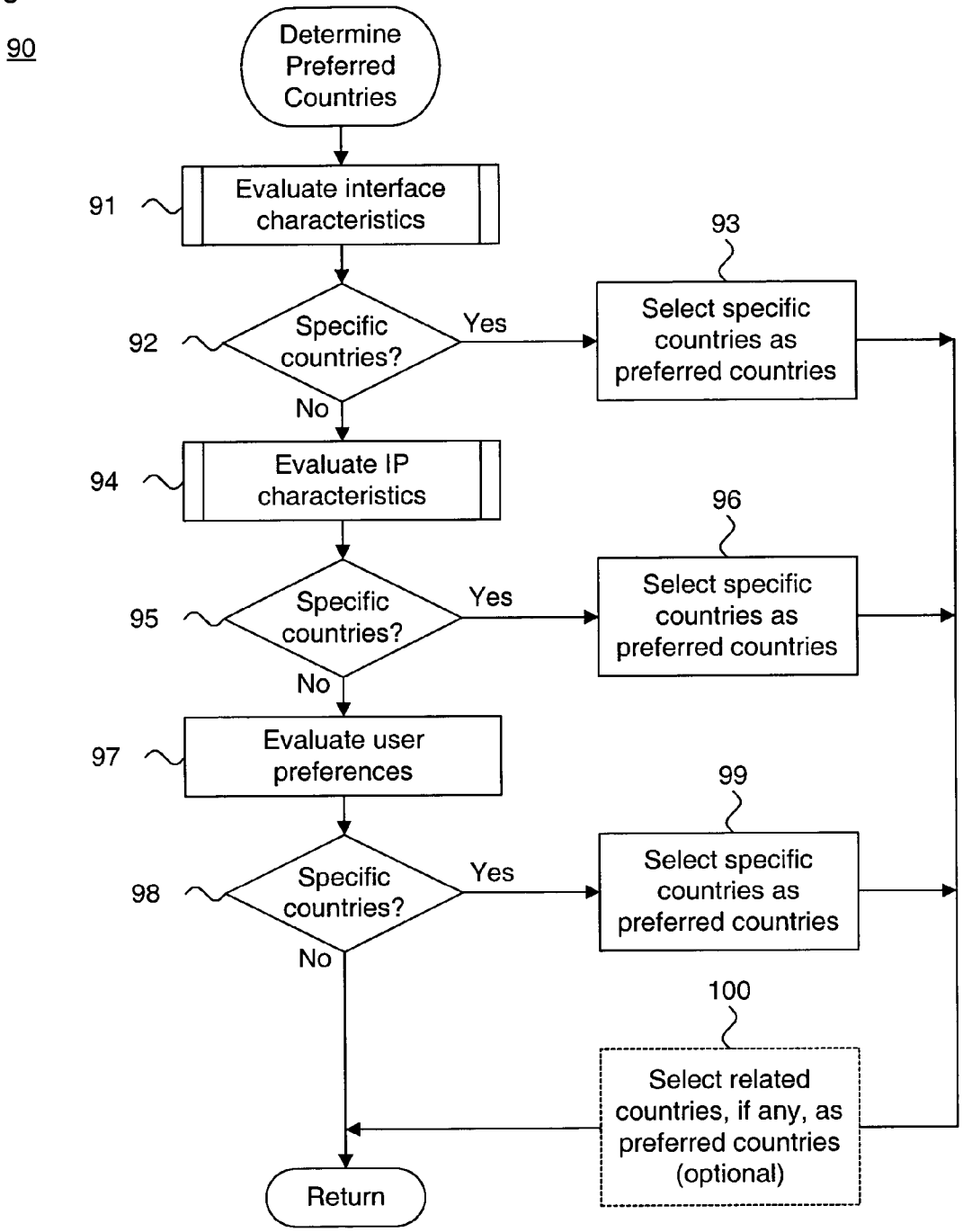
FIG. 5 is a flow diagram showing the routine for determining preferred countries for use in the method of FIG. 4.

FIG. 5 is a flow diagram showing the routine 90 for determining preferred countries 39 for use in the method 80 of FIG. 4. The purpose of this routine is to determine the preferred countries 39 of the requesting user 19 based on interface characteristics 43 and IP characteristics 44.

First, the interface characteristics 43 are evaluated (block 91) based on the metadata 48 parsed from the search query 36 and the search engine interface, as further described below with reference to FIG. 6. If specific countries can be determined based on the interface characteristics 43 (block 92), the specific countries are selected as the preferred countries 39 (block 93). Next, if no specific countries can be determined from the interface characteristics 43 (block 92), the IP characteristics 44 are evaluated (block 94) based on the metadata 48 parsed from the search query 36 and the IP address of the client, as further described below with reference to FIG. 7. If specific countries can be determined based on the IP characteristics 44 (block 95), the specific countries are selected as the preferred countries 39 (block 96). Next, if no specific countries can be determined from the IP characteristics 44 (block 95), the user preferences are evaluated, including the country preferences 42 (block 97). If specific countries can be determined based on the user preferences (block 98), the specific countries are selected as the preferred countries 39 (block 99). If no specific countries can be determined from the user preferences (block 95), a default or equivalent country is used. The routine then returns.

In the described embodiment, the search results 38 are provided in one of two formats. First, the search results 38 can be grouped as a collection of "raw" Web pages from which country characteristics can be determined. Second, the search results 38 can be organized into metadata describing the various characteristics, including country characteristics, and content of the Web pages corresponding to the search results 38. The predominant country or language of each search result 38 can be dynamically determined through content analysis, such as described in U.S. Pat. No. 6,167,369, issued Dec. 26, 2000 to Schulze, the disclosure of which is incorporated by reference.

For each instance in which one or more preferred country 39 has been selected (blocks 93, 96 and 99), related, alternate and less preferred countries, if any, can optionally be selected as additional preferred countries 39 (block 100). Related, alternate and less preferred countries include those countries having a reasonable nexus to a given country with respect to Web content and political, social and similar associations, as would be recognized by one skilled in the art, or which a user simply indicates as being related, alternate and less preferred. For instance, Canada and the United States share numerous attributes and Canadian users may find Web content retrieved from United States Web servers equally useful. Following any additions to the preferred countries 39, the routine returns.

Evaluating Interface Characteristics

Figure 6:
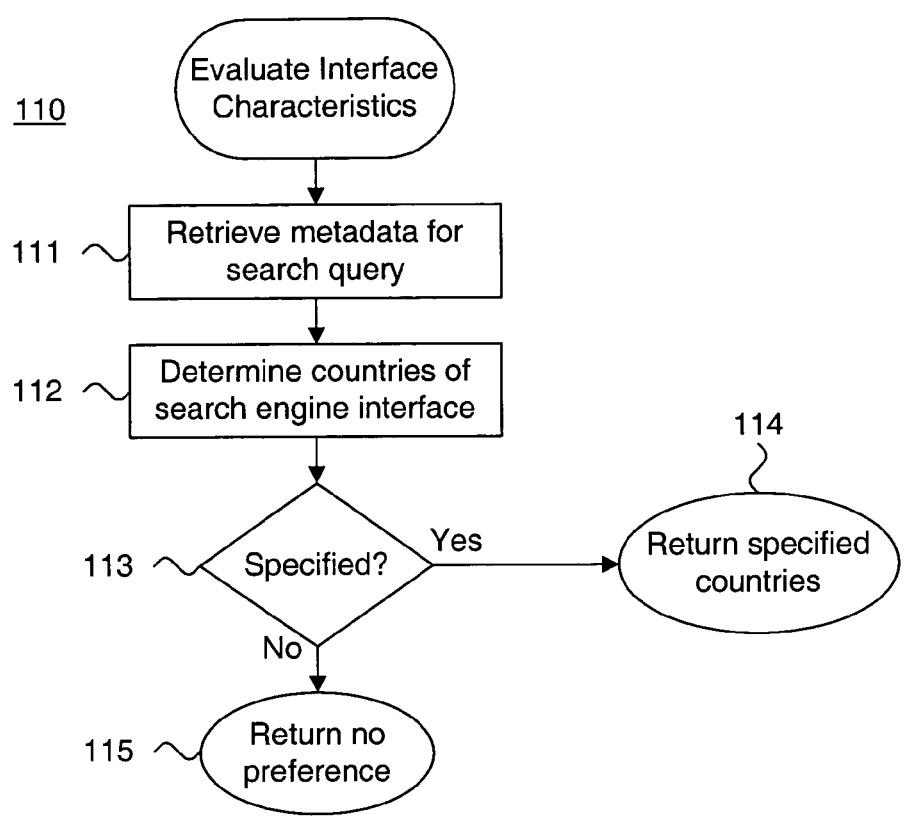
FIG. 6 is a flow diagram showing the function for evaluating interface characteristics for use in the routine of FIG. 5.

FIG. 6 is a flow diagram showing the function 110 for evaluating interface characteristics 43 for use in the routine 90 of FIG. 5. The purpose of this function is to determine any preferred countries 39 based on available metadata 48 parsed from the headers of the search query request message and the search engine interface.

First, any available metadata 48 corresponding to the headers of a search query request message are retrieved (block 111). Any specified countries are determined (block 112) by evaluating the search engine interface. The user interface is generated by the search engine 21 and express country preferences can often be specified as user options. Thus, any available country preferences are first determined. For example, a country-specific search engine interface, such as www.google.co.uk or www.google.de could respectively indicate user preferences for Web content retrieved from Web servers associated with the United Kingdom and Germany. Server-side country preferences are maintained either directly in a cookie stored at the client, or by the search engine 21 and accessed using cookies or log-in procedures to uniquely identify each requesting user 19. If available, the appropriate country-identifying cookie is retrieved, or the appropriate user log-in procedure is performed. If specified (block 113), the specified countries are returned (block 114). Otherwise, no country preferences are returned (block 115).

Evaluating IP Characteristics

Figure 7:
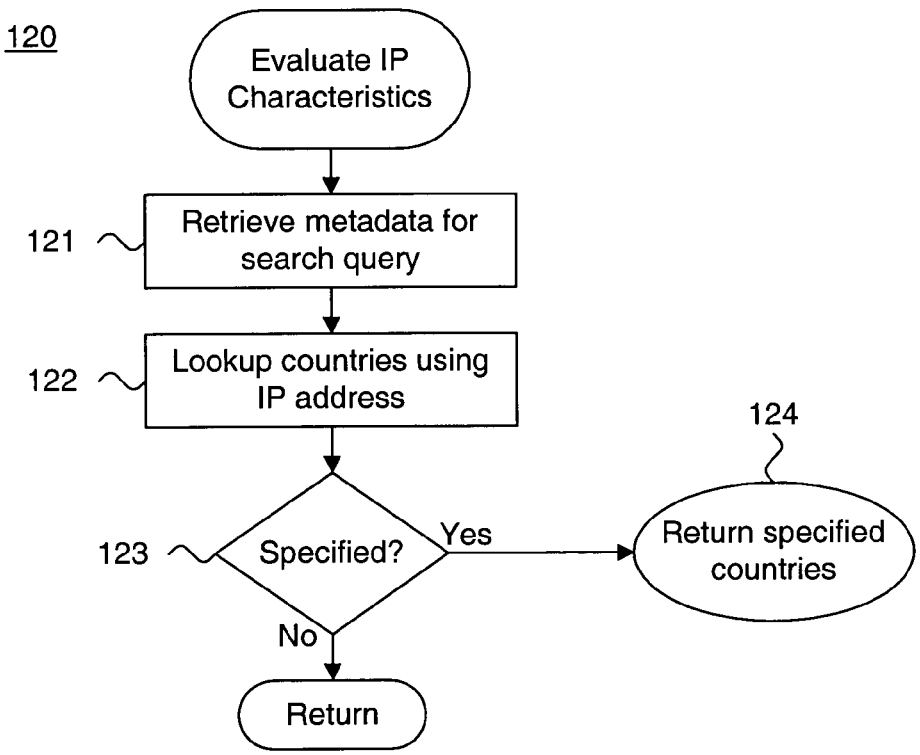
FIG. 7 is a flow diagram showing the function for evaluating IP characteristics for use in the routine of FIG. 5.

FIG. 7 is a flow diagram showing the function 120 for evaluating IP characteristics 44 for use in the routine 90 of FIG. 5. The purpose of this function is to determine any preferred countries 40 based on available metadata 48 parsed from the headers of the search query request message and the IP address of the client.

First, any available metadata 48 corresponding to the headers of a search query request message are retrieved (block 121). Any specified countries are obtained (block 112) by performing lookup mapping the IP address of the client to the country table 40. The location of the client 12 from which the search query 36 was sent can be determined by evaluating the header of the Transmission Control Protocol (TCP) packet within which the search query 36 was sent. The TCP header specifies an IP address, which is a 32-bit numeric address written as four numbers separated by periods. An IP domain can be determined by a Domain Name Service lookup of the last number in the IP address, as is known in the art. Other forms of client address mapping in addition to TCP/IP are feasible, as would be recognized by one skilled in the art. In the described embodiment, the predominant country for the domain specified in the IP address of the client 12 is selected using the country table 40 (block 123) and returned (block 124). Otherwise, if no IP address is provided (block 123), no country preferences are returned.

Ordering Search Results

Figure 8:
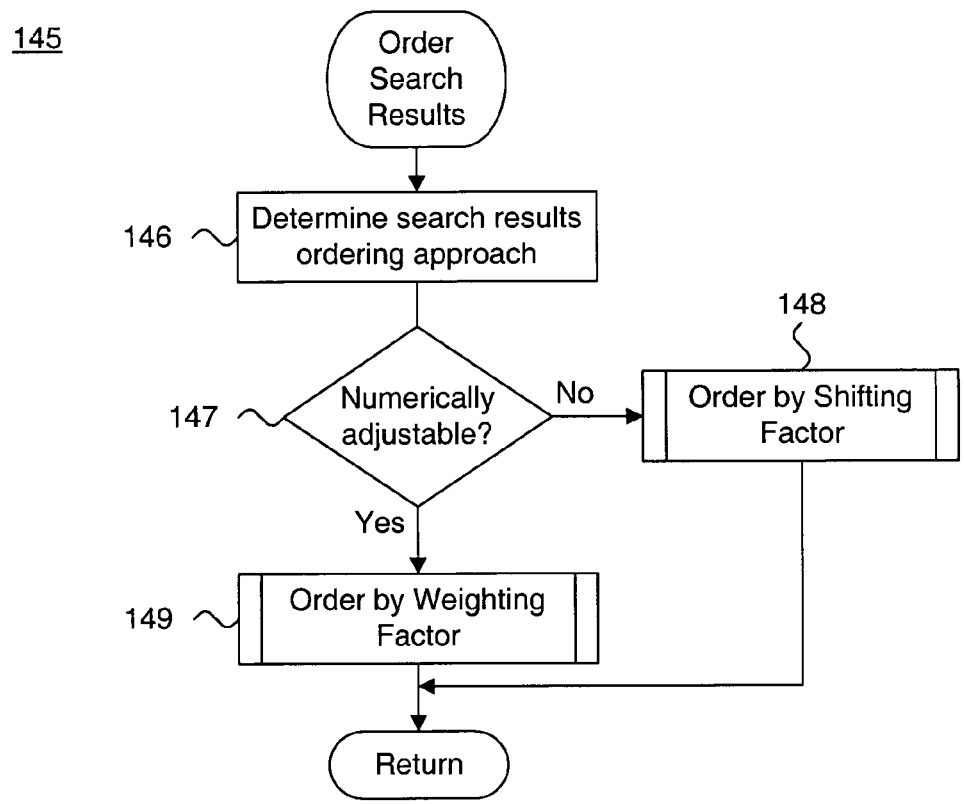
FIG. 8 is a flow diagram showing the routine for ordering search results for use in the method of FIG. 4.

FIG. 8 is a flow diagram showing the routine 145 for ordering search results 38 for use in the method 80 of FIG. 4. The purpose of this routine is to order the search results 38 based on the ranking or ordering method used, if any, by the search engine 21 in consideration of the preferred countries 39.

First, the approach utilized by the search engine 21 to rank or order the search results 38 is determined (block 146). If the numerical scores 41 assigned to the search results 38 are suitable for numerical adjustment (block 147), a numerical scoring approach is utilized, whereby the search results 38 are ordered using a weighting factor 46 (block 149), as further described below with reference to FIG. 10. Otherwise, the search results 38 are ordered by using a shifting factor 26 (block 148), as further described below with reference to FIG. 9. The routine then returns.

Ordering Search Results By A Shifting Factor

Figure 9:
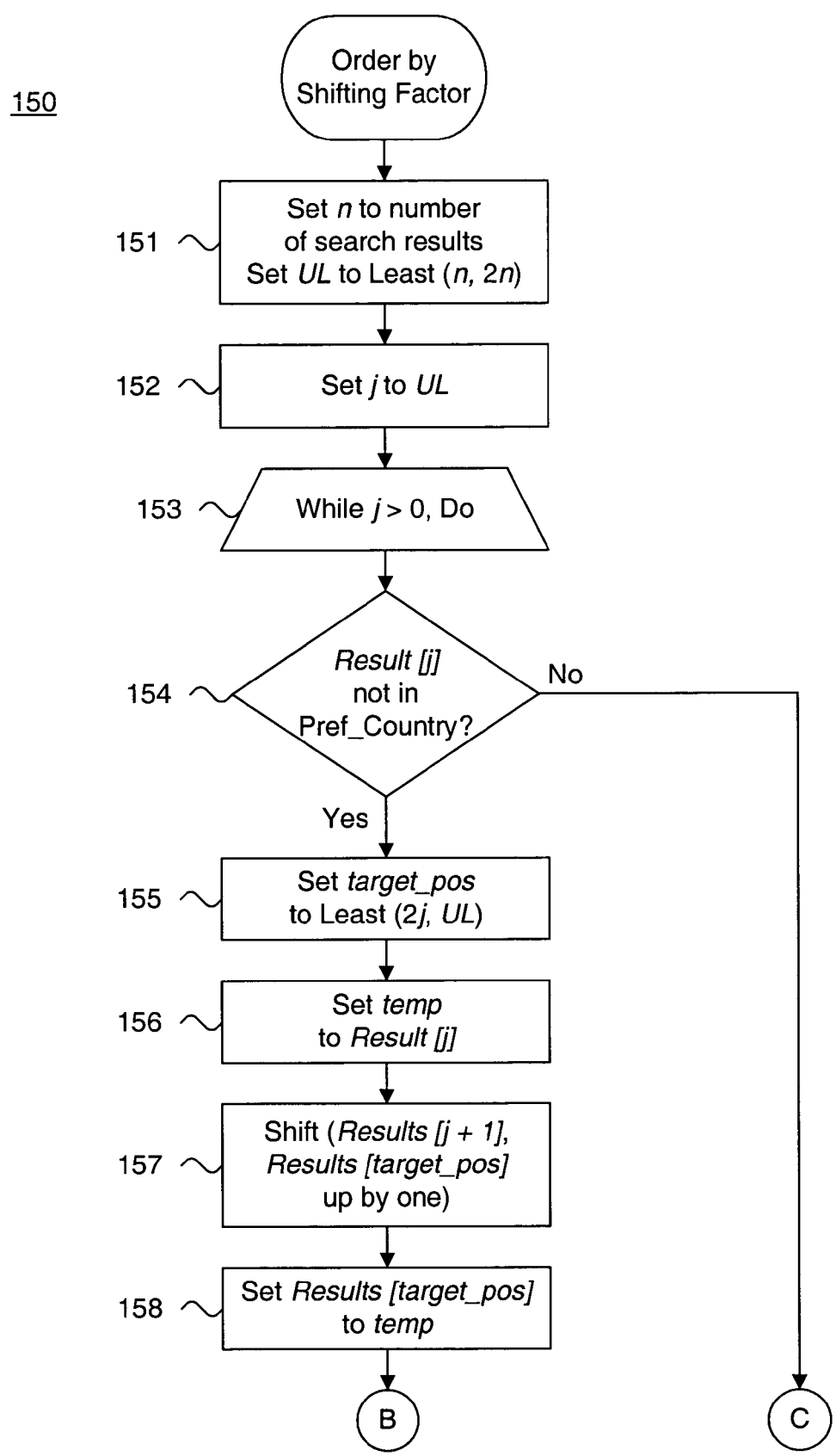
FIG. 9 is a flow diagram showing the routine for ordering search results by a shifting factor for use in the routine of FIG. 8.
Figure 9:
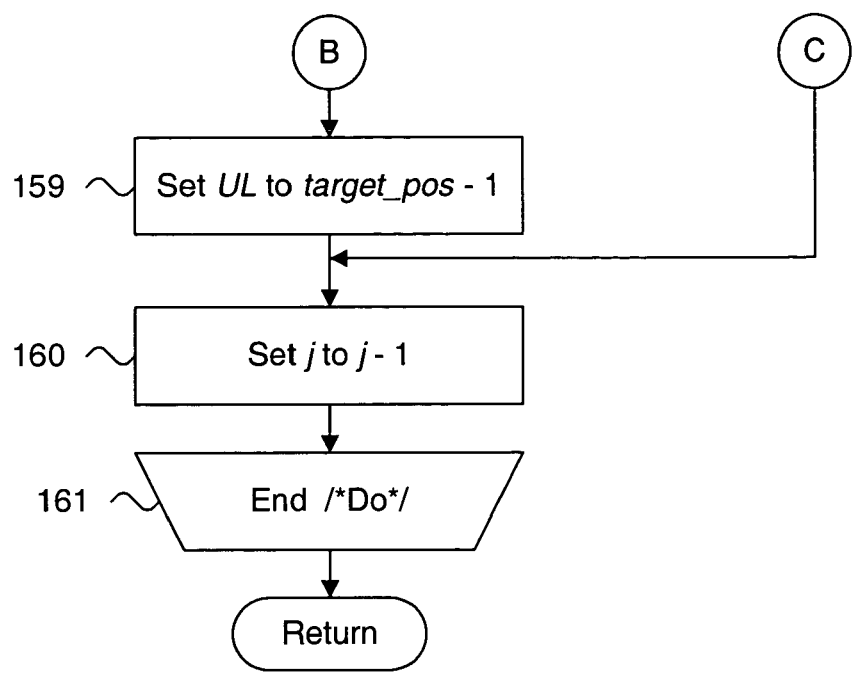

FIG. 9 is a flow diagram showing the routine 150 for ordering search results 38 by a shifting factor 45 for use in the routine 130 of FIG. 7. The purpose of this routine is to shift search results 38 associated with a non-preferred country down in relation to search results 38 associated with a preferred country 39. In the described embodiment, a constant shifting factor 45 of two (2.0) is employed to demote search results 38 in non-preferred countries by two positions. This shifting factor 38 is suitable when search results 38 are ordered by decreasing degree of match to the search query 36. For example, a search result 38 in a non-preferred country occurring in the third position of a list of the search results 38 would be demoted to the fifth position. Other forms of shifting factors could be employed as well. For instance, the shifting factor 45 could promote search results 38 in non-preferred countries. As well, the shifting factor 45 could order the search results 38 by mathematical functions, including additive, subtractive, multiplicative, fractional, divisional, and logarithmic factors, as well as various combinations and arrangements thereof, as would be recognized by one skilled in the art.

On one embodiment, the routine operates on a subset less than or equal to the total number of search results 38, although other forms of subset selection criteria could be used, as would be recognized by one skilled in the art. A variable n is set to the number of search results to be displayed to the user 19 and an upper limit UL for preferred countries 39 is set to the lesser of the number of search results 38, n, and twice n (block 151). The search results 38 are then ordered in an iterative processing loop (blocks 153-161) as follows. First, an index j is set to the upper limit UL (block 152) and processing is performed while the index j is positive (block 153). The search results are maintained in an array Result[ ]. If Result [j] is associated with a preferred country Pref_Country (block 154), Result [j] is skipped. Otherwise, if Result [j] is not associated with a preferred country Pref_Country (block 154), Result [j] is demoted by the shifting factor 45, as follows. A variable target_pos is set to the lesser of twice j and upper limit UL (block 155) and a temporary variable, temp, is set to Result [j] (block 156). The remaining search results 38 are promoted by shifting Results [j+1] through Results [target_pos] up by one (block 157) and Result [target_pos] is set to temp (block 158). The upper limit UL is set to target_pos minus one (block 159). The index j is set to j minus one (block 160) and processing continues with the next loop iteration (block 161), after which the routine returns.

Ordering Search Results By A Weighting Factor

Figure 10:
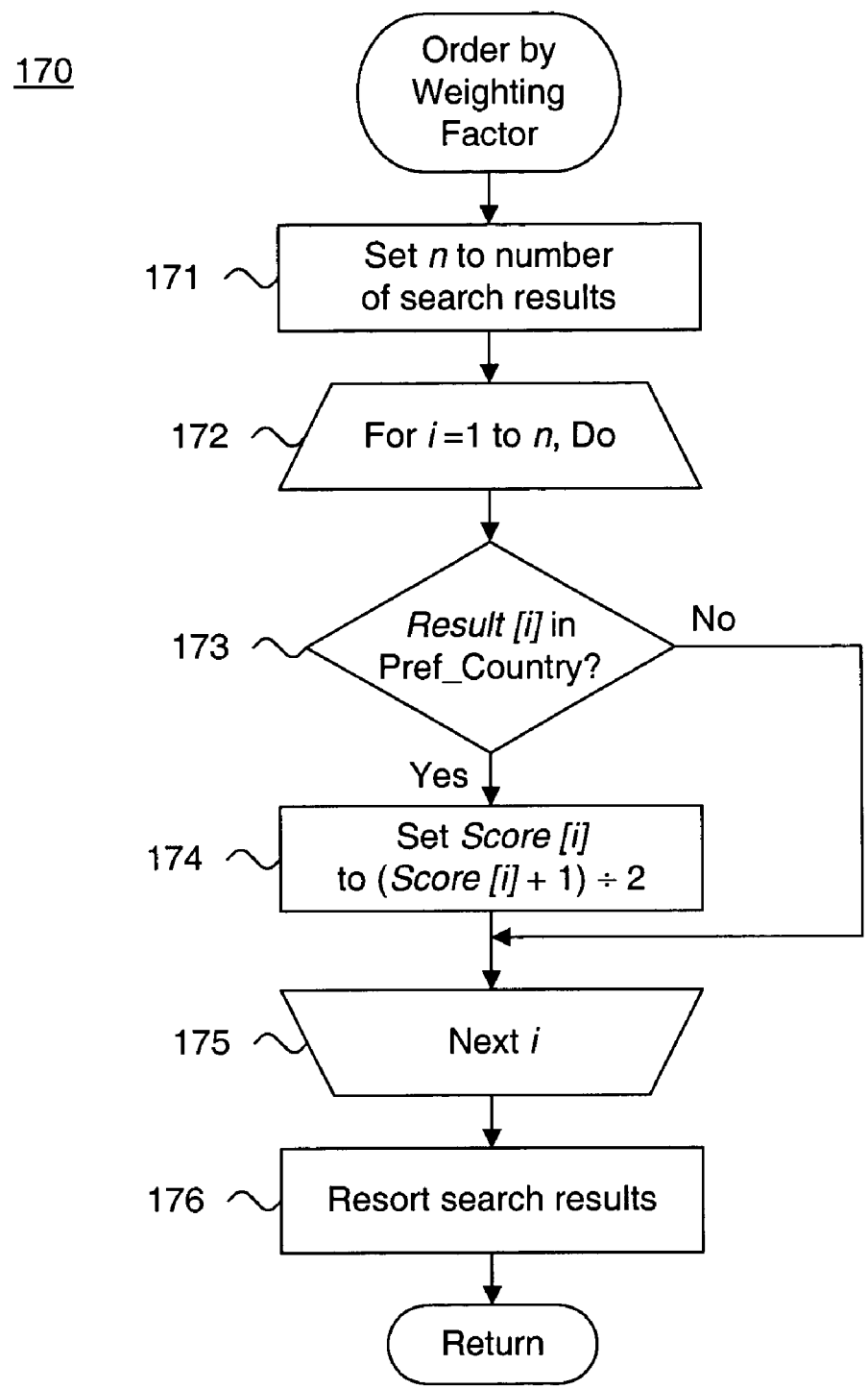
FIG. 10 is a flow diagram showing the routine for ordering search results by a weighting factor for use in the routine of FIG. 8.

FIG. 10 is a flow diagram showing the routine 170 for ordering search results 38 by a weighting factor 46 for use in the routine 130 of FIG. 7. The purpose of this routine is to order the search results 38 by recalculating the numerical score 41 assigned to each search result 38 to favor those search results in either one of the preferred countries 39. On one embodiment, the routine operates on a subset less than or equal to the number of search results 38, which equals the number of search results 38 to be displayed to the user multiplied by a margin, for instance, 2 or 3, although other forms of subset selection criteria could be used, as would be recognized by one skilled in the art.

In the described embodiment, the numerical scores 41 increase with the quality of match. For example, a higher numerical score 41 reflects a better quality than lower numerical scores 41. Alternatively, a system may be employed whereby the numerical scores 41 could decrease with quality of match, as would be recognized by one skilled in the art. In the described embodiment, a weighting factor 47 is used to increase the numerical score 41 of each search result 38 in one of the preferred countries 39. For search results 38 in one of the preferred countries 39, a weighting factor $W_{LP}$ is provided by the equation (1):

$$w_{LP} = \left\{ \forall s_{1 \to n} : s_i = \frac{s_i + 1}{2} \right\} \quad (1)$$

The weighting factor is most suitable when numerical scores 41 range between 0.0 and 1.0 and are approximately uniformly distributed. Other ranges of numerical scores and forms of weighting factors could be employed as well, as would be recognized by one skilled in the art.

The routine operates on a subset less than or equal to the total number of search results 38 and recalculates the numerical scores 41 through an iterative processing loop (blocks 172-177) as follows. A variable n is set to the number of search results to be multiplied by a margin, for instance 2 or 3 (block 171). The search results 38 are maintained in an array Results[ ]. The numerical score 41 for each search result 38 is recalculated in the iterative processing loop (blocks 172-177) indexed by a variable i. During each iteration (block 172), if Result [i] is associated with a preferred country Pref_Country (block 173), Score [i] is set to half the quantity Score[i] plus one (block 174), that is, Equation (1). Otherwise, if Result [i] is not associated with a preferred country, no numerical score adjustment is required and Result [i] is skipped. Processing continues with the next iteration (block 175). After all iterations, the search results 38 are resorted (block 176), after which the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A method, comprising:
    receiving a search query from a user;
    performing a search based on the search query to identify search results from a plurality of search result countries;
    identifying a particular country for the search results based on interface characteristics and Internet protocol (IP) characteristics,
        where the interface characteristics include information from the search query and information from a user interface via which the search query is received, and
        where the IP characteristics include information associated with a location from which the search query was sent;
    ordering the search results to create an ordered list of search results;
    determining whether the search results in the ordered list of search results are from the particular country;
    adjusting the order of one of the search results among other ones of the search results to create an adjusted list of search results when the one of the search results is from the particular country;
    presenting the adjusted list of search results; and
    permitting the user to toggle between presentation of the adjusted list of search results and the ordered list of search results.

2. A method according to claim 1, where adjusting the ordering of the one of the search results includes at least one of:
    demoting each search result from a country other than the particular country and promoting each search result from the particular country by at least one position within the ordered list of search results; or
    promoting each search result from a country other than the particular country and demoting each search result from the particular country by at least one position within the ordered list of search results.

3. A method according to claim 1, further comprising:
    assigning a numerical score to the search results; and
    adjusting the numerical score of at least some of the search results from the particular country.

4. A method according to claim 3, further comprising at least one of:
    increasing the numerical score assigned to the search results from the particular country and maintaining the numerical score assigned to the search results from a country other than the particular country; or
    decreasing the numerical score assigned to the search results from the particular country and maintaining the numerical score assigned to the search results from a country other than the particular country.

5. A method according to claim 1, further comprising:
    identifying a second country that is different than the particular country;
    determining whether the search results in the ordered list of search results are from the second country; and
    adjusting the ordering of a particular one of the search results among other ones of the search results when the particular one of the search results is from the second country.

6. A method according to claim 3, where adjusting the order of the one of the search results includes:
    sorting the at least some of the search results based on adjusted numerical scores.

7. A system implemented within a computing device, comprising:
    a memory to store instructions for implementing:
        a parser receiving a search query from a user;
        an indexer:
            executing a search based on the search query, and
            identifying search results from a plurality of countries based on the search;

a country promoter:
  identifying a particular country applicable to the search results based on interface characteristics and Internet protocol (IP) characteristics,
    where the interface characteristics include information from the search query and information from a user interface via which the search query is received, and
    where the IP characteristics include information associated with a location from which the search query was sent,
  ordering the search results to create an ordered list of search results, and
  adjusting the ordering of at least one of the search results among other ones of the search results to create an adjusted list of search results based on whether the at least one of the search results is from the particular country; and
a presenter permitting the user to toggle between presentation of the adjusted list of search results and the ordered list of search results; and
a processor to execute the instructions in the memory.

8. A system according to claim 7, where the memory further stores instructions for implementing:
a search result orderer ordering the search results based on a match of a country of the search results to the particular country.

9. A system according to claim 8, where:
the search result orderer demotes the search results from a country other than the particular country by a predefined shifting factor.

10. A system according to claim 9, wherein the predefined shifting factor substantially equals two (2.0).

11. A system according to claim 8, where:
the search result orderer promotes the search results from a country other than the particular country by a predefined shifting factor.

12. A system according to claim 7, where the memory further stores instructions for implementing:
a scorer ordering each of the search results by a degree of match to the information in the searchable data repository.

13. A system according to claim 7, where the memory further stores instructions for implementing at least one of:
a Uniform Resource Locator (URL) analyzer determining a URE extension based on characteristics of the search results;
a domain registrar examiner:
  examining a domain registrar address based on characteristics of the search results, and
  inferring the particular country from a business associated with the domain registrar address;
a country inferrer inferring the particular country from at least one of Internet Protocol (IP) addresses of: Web severs from which the search results were obtained, search result documents for the search results, or other Web pages on same Web sites as the search results; or
a hyperlink analyzer examining anchor text of hyperlinks to the search result documents, text near the hyperlinks, or countries of Web pages with hyperlinks to the search result documents.

14. A system according to claim 7, where the search results are assigned a numerical score, the memory further storing instructions for implementing:
a search result orderer increasing the numerical score assigned to at least some of the search results from the particular country.

15. A system according to claim 14, wherein the numerical score is adjusted in accordance with the formula:

$$s_i = \frac{s_i + 1}{2}$$

where $s_i$ comprises the numerical score for each search result i.

16. A system according to claim 7, where the search results are assigned a numerical score, the memory further storing instructions for implementing:
a search result orderer decreasing the numerical score assigned to at least some of the search results from the particular country.

17. A system according to claim 7, where:
the presenter presents the search results in the adjusted list.

18. A system according to claim 17, where:
the presenter at least one of: controls enablement of presentation of at least some of the search results from the particular country, groups together at least some of the search results from the particular country, or arranges at least some of the search results from the particular country next to at least some of the search results from at least one country other than the particular country prior to presenting the search results.

19. A method, comprising:
receiving a search query from a user;
executing a search to create a list of search results by evaluating the search query against information from a plurality of search result countries that is maintained in a searchable data repository;
determining a particular country applicable to search results generated responsive to the executed search based on interface characteristics and Internet protocol (IP) characteristics,
  where the interface characteristics include information from the search query and information from a user interface via which the search query is received, and
  where the IP characteristics include information associated with a location from which the search query was sent;
determining whether each of the search results are from the particular country;
ordering one of the search results among other ones of the search results based on whether the one of the search results is from the particular country; and
permitting the user to toggle between presentation of the list of search results with the one of the search results ordered among the other ones of the search results based on whether the one of the search results is from the particular country, and presentation of the list of search results without the one of the search results ordered among the other ones of the search results based on whether the one of the search results is from the particular country.

20. A method according to claim 19, further comprising:
ordering the search results based on a match of a country of the search results to the particular country.

21. A method according to claim 19, further comprising:
ordering the search results by degree of match of a country of the search results to the particular country.

22. A method according to claim 21, further comprising:
demoting the search results from a country other than the particular country by a predefined shifting factor.

23. A method according to claim 22, wherein the predefined shifting factor substantially equals two (2.0).

24. A method according to claim 21, further comprising:
promoting the search results from a country other than the particular country by a predefined shifting factor.

25. A method according to claim 19, further comprising:
ordering each of the search results by a degree of match of terms of the search query to contents of the search results.

26. A method according to claim 19, where the search results are assigned a numerical score, the method further comprising:
increasing the numerical score assigned to at least some of the search results from the particular country.

27. A method according to claim 26, wherein the numerical score is adjusted in accordance with the formula:

$$s_i = \frac{s_i + 1}{2}$$

where $s_i$ comprises the numerical score for each search result i.

28. A method according to claim 19, where the search results are assigned a numerical score, the method further comprising:
decreasing the numerical score assigned to at least some of the search results from the particular country.

29. A method according to claim 19, further comprising:
presenting the search results.

30. A method according to claim 29, further comprising:
performing at least one of controlling enablement of presentation of at least some of the search results from the particular country, grouping together at least some of the search results from the particular country, or arranging at least some of the search results from the particular country next to at least some of the search results from at least one country other than the particular country prior to presenting the search results.

31. A method according to claim 19, further comprising:
selecting a second country that is different from the particular country.

32. A system implemented within a computing device, comprising:
a memory to store instructions for implementing:
a parser receiving a search query request message from a user, and parsing at least one of terms or attributes from the search query request message to identify Web content provided from a plurality of search result countries;
an indexer executing a search by evaluating the at least one of terms or attributes against information maintained in a searchable data repository and generating search results responsive to the executed search;
a country promoter identifying a particular country, comprising:
a country determiner evaluating characteristics of the search query request message and characteristics of the search results, and selecting the particular country based on interface characteristics and Internet protocol (IP) characteristics,
where the interface characteristics include information from the search query message and information from a user interface via which the search query message is received, and
where the IP characteristics include information associated with a location from which the search query message was sent; and
a country orderer determining an order for at least some of the search results among other ones of the search results based on whether the at least some of the search results are from the particular country; and
a presenter permitting the user to toggle between presentation of the search results in the determined order and presentation of the search results in another order that is independent of whether the at least some of the search results are from the particular country; and
a processor to execute the instructions in the memory.

33. A system according to claim 32, where the search results are generated in a ranked order, the memory further storing instructions for implementing:
a search result orderer ordering at least some of the search results from the particular country by a predefined shifting factor, comprising at least one of demoting each search result from a country other than the particular country by the predefined shifting factor and promoting each search result from the particular country by at least one position, or promoting each search result from a country other than the particular country by the predefined shifting factor and demoting each search result from the particular country by at least one position.

34. A system according to claim 33, where:
the search result orderer adjusts the predefined shifting factor based on available context in the search query request message and the search results.

35. A system according to claim 32, where the search results are generated in a ranked order by numerical score, the memory further storing instructions for implementing:
a search result orderer adjusting the numerical score of at least some of the search results by a predetermined weighting factor, comprising at least one of increasing the numerical score assigned to the search results from the particular country and maintaining the numerical score assigned to the search results from a country other than the particular country, or decreasing the numerical score assigned to the search results from the particular country and maintaining the numerical score assigned to the search results from a country other than the particular country.

36. A system according to claim 35, where:
the search result orderer adjusts the predetermined weighting factor based on available context in the search query request message and the search results.

37. A system according to claim 32, wherein the search query request message is HTTP-compliant.

38. A method, comprising:
receiving a search query request message from a user, and parsing at least one of terms or attributes from the search query request message to identify Web content provided from a plurality of search result countries;
executing a search by evaluating the at least one of terms or attributes against information maintained in a searchable data repository and generating search results responsive to the executed search;
determining a particular country, comprising:
evaluating characteristics of the search query request message and characteristics of the search results; and
selecting the particular country based on interface characteristics and Internet protocol (IP) characteristics,
where the interface characteristics include information from the search query message and information from a user interface via which the search query message is received, and where the IP characteristics include information associated with a location from which the search query message was sent;

determining an order for the search results among other ones of the search results based on whether the search results are from the particular country;

presenting the search results in the determined; and permitting the user to toggle between presentation of the search results in the determined order and presentation of the search results in another order that is independent of whether the search results are from the particular country.

39. A method according to claim 38, where the search results are generated in a ranked order, the method further comprising:

ordering at least some of the search results from the particular country by a predefined shifting factor, comprising at least one of:

demoting each search result from a country other than the particular country by the predefined shifting factor and promoting each search result from the particular country by at least one position; or promoting each search result from a country other than the particular country by the predefined shifting factor and demoting each search result from the particular country by at least one position.

40. A method according to claim 39, further comprising:

adjusting the predefined shifting factor based on available context in the search query request message and the search results.

41. A method according to claim 38, where the search results are generated in a ranked order by numerical score, the method further comprising:

adjusting the numerical score of at least some of the search results by a predetermined weighting factor comprising at least one of:

increasing the numerical score assigned to the search results from the particular country and maintaining the numerical score assigned to the search results from a country other than the particular country; or decreasing the numerical score assigned to the search results from the particular country and maintaining the numerical score assigned to the search results from a country other than the particular country.

42. A method according to claim 41, further comprising:

adjusting the predetermined weighting factor based on available context in the search query request message and the search results.

43. A method according to claim 38, wherein the search query request message is HTTP-compliant.

44. A method comprising:

receiving a search query from a user;

performing a search, based on the search query, to identify a group search results;

ordering the group of search results to form a first ordered list of search results;

identifying a country for the group of search results based on interface characteristics and Internet protocol (IP) characteristics, where the interface characteristics include information from the search query and information from a user interface via which the search query is received, and where the IP characteristics include information associated with a location from which the search query was sent;

determining whether each search result in the first ordered list of search results is from the identified country;

adjusting, for each of the search results that is from the identified country, a position of the search result within the first ordered list of search results to create a second ordered list of search results, where the second ordered list of search results is different from the first ordered list of search results;

presenting the second ordered list of search results; and permitting the user to toggle between presentation of the first ordered list of search results and the second ordered list of search results.

45. A computer-readable storage medium storing computer-executable instructions, comprising:

one or more instructions for receiving a search query from a user via a user interface;

one or more instructions for executing a search to generate search results from a plurality of countries;

one or more instructions for determining a particular country, comprising:

one or more instructions for evaluating characteristics of the search query and characteristics of the user interface, where the characteristics of the search query differ from the characteristics of the user interface; and one or more instructions for selecting the particular country based on interface characteristics and Internet protocol (IP) characteristics, where the interface characteristics include information from the search query and information from a user interface via which the search query is received, and where the IP characteristics include information associated with a location from which the search query was sent;

one or more instructions for ordering at least some of the search results among other ones of the search results based on whether the at least some of the search results are from the particular country;

one or more instructions for presenting the ordered search; and one or more instructions for permitting the user to toggle between presentation of the ordered search results and presentation of the search results in another order that is independent of whether the at least some of the search results are from the particular country.

* * * * *

UNITED STATES PATENT AND TRADEMARK OFFICE
CERTIFICATE OF CORRECTION

| | | |
|---|---|---|
| PATENT NO. | : 7,451,130 B2 | Page 1 of 1 |
| APPLICATION NO. | : 10/607927 | |
| DATED | : November 11, 2008 | |
| INVENTOR(S) | : Vineet Gupta et al. | |

It is certified that error appears in the above-identified patent and that said Letters Patent is hereby corrected as shown below:

Column 15, line 46 reads: "a URE extension based on characteristics of the search" and should correctly read as follows: "a URL extension based on characteristics of the search"

Column 19, line 9 reads: "presenting the search results in the determined; and", and should correctly read as follows: "presenting the search results in the determined order; and"

Column 20, line 50 reads: "one or more instructions for presenting the ordered search;", and should correctly read as follows: "one or more instructions for presenting the ordered search results;"

Signed and Sealed this

Thirtieth Day of December, 2008

JON W. DUDAS
*Director of the United States Patent and Trademark Office*